No. 661,630. Patented Nov. 13, 1900.
A. M. ALLEN.
BICYCLE.
(Application filed June 16, 1897.)
(No Model.)
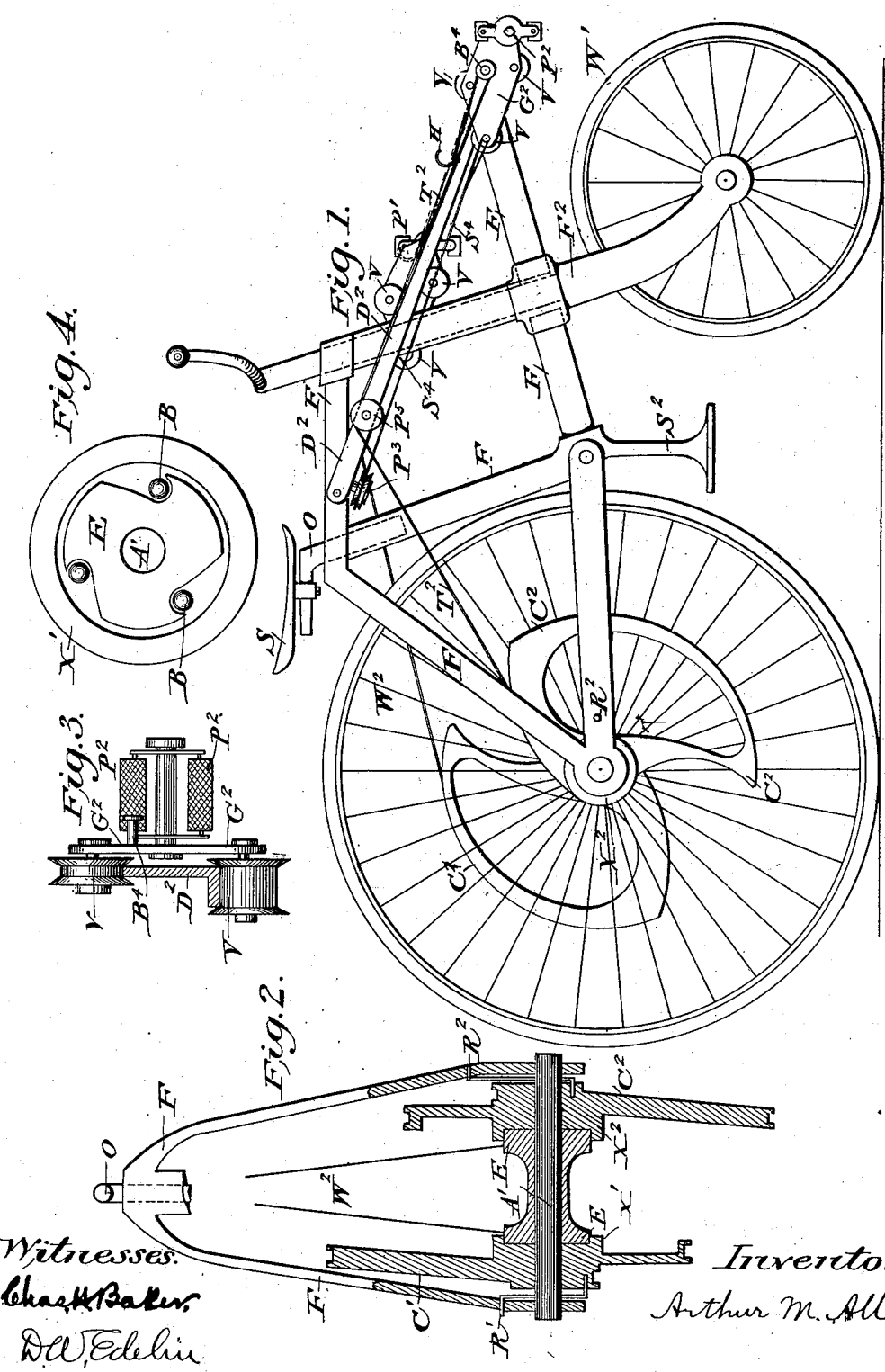
Witnesses:
Chas H Baker
D W Edelin
Inventor
Arthur M. Allen
THE NORRIS PETERS CO., PHOTO-LITHO., WASHINGTON, D. C.

UNITED STATES PATENT OFFICE.

ARTHUR M. ALLEN, OF NEW YORK, N. Y.

BICYCLE.

SPECIFICATION forming part of Letters Patent No. 661,630, dated November 13, 1900.

Application filed June 16, 1897. Serial No. 641,061. (No model.)

*To all whom it may concern:*

Be it known that I, ARTHUR M. ALLEN, a citizen of the United States, and a resident of New York, (West New Brighton,) Richmond county, New York, have invented a new and useful Improvement in Bicycles, of which the following is a specification.

My invention relates to such improvements in bicycles as will provide an erect position for the rider, an oblique forward tread in a right line instead of a circle, and a means of changing the gear while in motion. The driving-gear is arranged in front of and beyond the front fork, and for this the front wheel must be much smaller than the rear wheel. I attain these objects by mechanism illustrated in the accompanying drawings, in which—

Figure 1 is a side elevation of the bicycle. Fig. 2 is a sectional back view of the hind frame and wheel with clutch-gear and cams. Fig. 3 is an end view of one pedal and carriage. Fig. 4 shows clutch mechanism between the loose spiral and cam gear and the wheel-hub.

The hind wheel supports the frame and seat-post by an axle fixed in its sides. Each side of the wheel-hub is arranged to be clutched by an overlapping spiral loose gear between the wheel and frame side. This loose gear or pulley has a flat or grooved spiral surface and a strap connection to the pedals to obtain the most speed when the most power is applied and also a spring for reversing the gear for the next stroke. In three oblique notches in each hub end are three loose balls or rollers which are wedged against the overlap of the gear by pulling the strap and released by the return. A pair of bars or guides extend from the top-frame-bar center to the end of an extension of the lower bar beyond the fork. On each guide a roller pedal-carriage is mounted, and a strap passing over an intermediate pulley near the top frame-bar connects the loose spiral gear on the back axle to it. This intermediate gear makes the push-line direct. By a strap-and-pulley connection between the two pedal-carriages each foot brings back the other pedal. By this arrangement the rider can suit himself as to the length of foot-stroke, and the seat needs no change of position. Besides its spiral surface, each loose gear has a cam fixed to it, so that by allowing the return-spring to operate farther back the strap operates on the part of the cam with the greater radius only and very greatly reduces the gear of the bicycle. The rider makes this change on one side at a time while in motion by adjusting the position of a hand-hook on the strap near the pedal.

A step suspended near the center of the frame allows the rider to mount either side.

The frame shown is somewhat like the diamond; but two plain forks and a steer-joint would serve as well.

The special feature of this invention is the arrangement of foot driving-gear in front of and beyond the front fork and entirely above and clear of the front wheel, which thereby may turn on the shortest curves, as distinct from the arrangements between the wheels or on the front-wheel axle, or such driving mechanism secured to the front frame as either limits or prevents the use of the front wheel for steering, which are now or have been in use. Therefore I do not confine myself to the guides and roller-carriage, although it is the best application of the foot-power, but may use the cranks and sprocket in front, with sprocket on the hind wheel or rocking levers with the straps or any foot driving-gear whatever if it is arranged in front of and beyond the front fork and entirely above the front wheel.

In the drawings the hind frame F is supported by hind wheel $W^2$ on axle A, fixed in its sides. (See Figs. 1 and 2.) On the hub E of wheel $W^2$ are oblique notches, with balls B or rollers, (see Fig. 4,) which with the overlap of loose spiral gears $X'$ $X^2$, mounted on axle A, form clutches. Two straps $T'$ $T^2$, passing over line-pulleys $P^4$ $P^5$, connect these spiral gears to the front driving foot-gear, (see Fig. 1,) and return-springs $R'$ $R^2$ reverse them for the next stroke. The spiral gears have also cams $C'$ $C^2$, fixed to them to reduce the gear for hillwork.

The seat S is fixed on a post O near the back of the frame and a step $S^2$ is hung below.

The neck N of the front fork $F^2$ is pivoted in the head of hind frame F and the small front wheel $W'$ mounted therein.

Guides $D'$ $D^2$ extend from the top frame-bar forward to the ends of the extension of the lower bar of frame F. (See Fig. 1.) On each guide a pedal-carriage G, (see Figs. 3 and 1,) with three rollers V, is mounted and passes up and down on a direct oblique line from the seat. Pedals P' P² and strap-bolts B⁴ are attached. (See Fig. 1.) Another strap S⁴, passing over pulley P³, connects the carriages to each other and enables each foot to bring back the other pedal and also to rest both feet while coasting and controlling the vehicle by any suitable brake and handle. The strap T² loops around strap-bolt B⁴ and is retained by a hand-hook H (see Fig. 1) in a hole in strap T² and may be adjusted to another hole by the rider while in motion, the upper part of the hook being bent like a handle for that purpose.

What I claim as new, and am desirous of securing by Letters Patent, is—

1. In a wheeled vehicle, a hind wheel with a frame and steering-head, and a fork, in which is mounted a smaller and front wheel, pivoted in said steering-head, in combination with foot driving-gear arranged above and entirely clear of the front wheel and beyond the fork.

2. In a wheeled vehicle, guides D' D², pedal-carriages G' G², pedals P' P², all arranged in front of the fork and above, and clear of, the front wheel, and an operating connection to the hind wheel.

3. Alternating pedals P' P² secured to each other by strap S⁴ over pulley P³, guides D' D², and pedal-carriages G' G², all arranged forward of the fork, and clear of, and above the front wheel, in combination with clutch mechanism on the hind-wheel axle, and a flexible connection thereto.

4. In a wheeled vehicle, two wheels mounted in line in a frame, the front wheel in a fork, which is pivoted in a steering-head in the hind frame, and provided with a seat on the frame between the wheels, in combination with sliding pedal mechanism arranged below the line of the upper frame-bar, in front of the fork and above and entirely clear of the front wheel, and an operating connection to the hind wheel.

In testimony that I claim the foregoing as my invention I have signed my name, in presence of two witnesses, this 27th day of May, 1897.

ARTHUR M. ALLEN.

Witnesses:
 ROBERT SCHALKENBACH,
 JAMES WEIR.